(12) United States Patent
Alden et al.

(10) Patent No.: US 11,246,451 B2
(45) Date of Patent: Feb. 15, 2022

(54) BURNER TUBE FOR GAS GRILL

(71) Applicant: Weber-Stephen Products LLC, Palatine, IL (US)

(72) Inventors: J. Michael Alden, Palatine, IL (US); Mohammed Shoeb, Streamwood, IL (US); Kevin James Schmeski, Romeoville, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 397 days.

(21) Appl. No.: 14/880,654

(22) Filed: Oct. 12, 2015

(65) Prior Publication Data

US 2017/0102142 A1  Apr. 13, 2017

(51) Int. Cl.
| | |
|---|---|
| A47J 37/07 | (2006.01) |
| F23D 14/58 | (2006.01) |
| F23D 14/10 | (2006.01) |
| F23D 14/64 | (2006.01) |
| F23D 14/26 | (2006.01) |
| F23D 14/84 | (2006.01) |
| F23N 1/02 | (2006.01) |

(52) U.S. Cl.
CPC .......... *A47J 37/0713* (2013.01); *F23D 14/10* (2013.01); *F23D 14/105* (2013.01); *F23D 14/26* (2013.01); *F23D 14/58* (2013.01); *F23D 14/64* (2013.01); *F23D 14/84* (2013.01); *F23N 1/02* (2013.01); *F23D 2900/00003* (2013.01)

(58) Field of Classification Search
CPC ......... F23D 14/10; F23D 14/15; F23D 14/105
See application file for complete search history.

(56) References Cited

U.S. PATENT DOCUMENTS

| | | | | |
|---|---|---|---|---|
| 1,077,073 A | | 10/1913 | Hook | |
| 1,388,609 A | * | 8/1921 | Sharp | F23D 14/10 |
| | | | | 239/556 |
| 1,507,791 A | | 9/1924 | Packer | |
| 2,041,706 A | * | 5/1936 | Hahn | F23D 14/105 |
| | | | | 239/553 |
| 2,044,528 A | | 6/1936 | Guhl | |
| 2,084,489 A | * | 6/1937 | Hess | F02M 7/22 |
| | | | | 261/50.2 |
| 2,424,654 A | | 7/1947 | Gamble | |
| 2,546,673 A | * | 3/1951 | Mattix | G05D 7/0173 |
| | | | | 138/45 |

(Continued)

FOREIGN PATENT DOCUMENTS

| | | |
|---|---|---|
| CN | 201184593 Y | 1/2009 |
| CN | 205191571 U | 4/2016 |

(Continued)

OTHER PUBLICATIONS

Examination Report No. 2 dated Oct. 24, 2017 in corresponding Australian Patent Application No. 2016238926.

(Continued)

*Primary Examiner* — Jason Lau
(74) *Attorney, Agent, or Firm* — Hanley, Flight & Zimmerman, LLC

(57) ABSTRACT

The present inventions provide, among other things, tapered burner tubes having raised gas ports and a smooth interior surface free from obstructions. Venturi members and air shutters may also be included.

19 Claims, 3 Drawing Sheets

(56) References Cited

U.S. PATENT DOCUMENTS

| | | | |
|---|---|---|---|
| 2,755,851 A | 7/1956 | Dow | |
| 2,781,088 A * | 2/1957 | Ayers | F23D 14/10 239/566 |
| 2,808,878 A | 10/1957 | Ayers | |
| 2,815,070 A * | 12/1957 | Lamar | F23D 14/64 48/180.1 |
| 3,269,165 A | 8/1966 | Anderson | |
| 3,446,566 A | 5/1969 | Miller | |
| 3,567,137 A | 3/1971 | Cavestany | |
| 3,733,901 A | 5/1973 | Halmi | |
| 3,990,433 A * | 11/1976 | Keating | A47J 37/1247 126/391.1 |
| 3,990,838 A | 11/1976 | Jerde | |
| 4,118,175 A | 10/1978 | Riehl | |
| 4,346,845 A | 8/1982 | Meyerhoff | |
| 4,418,456 A * | 12/1983 | Riehl | F23D 14/10 239/566 |
| 4,509,371 A | 4/1985 | Wellman | |
| 4,827,899 A | 5/1989 | Walters et al. | |
| 5,062,788 A | 11/1991 | Best | |
| 5,423,675 A | 6/1995 | Kratsch | |
| 5,746,588 A | 5/1998 | Binzer | |
| 6,364,657 B1 | 4/2002 | O'Donnell | |
| 6,450,800 B1 | 9/2002 | Cash | |
| 6,616,193 B2 * | 9/2003 | Anderson | F16L 37/008 285/140.1 |
| 6,699,036 B2 | 3/2004 | Schlosser | |
| 6,793,487 B2 | 9/2004 | Hubbauer | |
| 6,945,774 B2 | 9/2005 | Shoeb | |
| 7,506,645 B2 | 3/2009 | Offredi | |
| 10,667,648 B2 | 6/2020 | Alden et al. | |
| 2004/0173200 A1 | 9/2004 | Shoeb | |
| 2005/0138789 A1 | 6/2005 | Offredi | |
| 2010/0154775 A1 | 6/2010 | Robinson | |
| 2017/0108213 A1 | 4/2017 | Voss | |

FOREIGN PATENT DOCUMENTS

| | | |
|---|---|---|
| DE | 2600650 A1 | 7/1977 |
| DE | 19540772 A1 | 5/1997 |
| DE | 10004159 A1 | 8/2001 |
| EP | 3156724 A1 | 4/2017 |
| FR | 2093148 A5 | 1/1972 |
| GB | 364105 A | 1/1932 |
| GB | 590092 A | 7/1947 |
| GB | 1147268 A | 4/1969 |
| GB | 1162874 A | 8/1969 |
| GB | 2174189 A | 10/1986 |
| JP | S4888409 U | 10/1973 |
| JP | S4972082 U | 6/1974 |
| JP | S50-036138 U | 4/1975 |
| JP | S5029558 U | 4/1975 |
| JP | S51-001830 U | 1/1976 |
| JP | S511830 | 1/1976 |
| JP | S51-111231 U | 9/1976 |
| JP | S5280867 U | 6/1977 |
| JP | S52131515 U | 10/1977 |
| JP | S54-008139 U | 1/1979 |
| JP | S548139 | 1/1979 |
| JP | S54-057634 U | 4/1979 |
| JP | S58181075 U | 12/1983 |
| JP | S60-091929 U | 6/1985 |
| JP | S62184852 U | 11/1987 |
| JP | H01-151024 U | 10/1989 |
| JP | H1038230 A | 2/1998 |
| JP | 2007225267 A | 9/2007 |
| MY | 126290 A | 9/2006 |

OTHER PUBLICATIONS

Replacement burner tube available from Sears.
CSA Group, Outdoor cooking gas appliances, ANSI Z21.58-2014, Jul. 2015.
Extended European Search Report dated Mar. 10, 2017 in corresponding European Application No. 16193255.3.
Jul. 13, 2017 Office Action and Search Report in corresponding Taiwanese Application No. 105132789.
Extended Search Report dated Feb. 5, 2019 in corresponding European Application No. 18192938.1.
Examination Report No. 1 dated May 2, 2019 in corresponding Australian Application No. 2018202159.
Examination Report dated Feb. 12, 2019 in corresponding European Application No. 16193255.3.
Second Office Action dated Feb. 22, 2019 in corresponding Chinese Application No. 201610889069.3.
Office Action dated Jul. 23, 2019 in corresponding Japanese Application No. 2018-170171.
First Office Action dated Jul. 30, 2019 in corresponding Chinese Application No. 201811062434.9.
Office Action dated Apr. 28, 2020 in corresponding Canadian Application No. 3,016,393.
Notice of Reason for Rejection dated Apr. 28, 2020 in corresponding Japanese Application No. 2018-170171.
IP Australia, "Examination report No. 1," issued in connection with Australian Patent Application No. 2016238926, dated Jun. 19, 2017, 4 pages.
IP Australia, "Examination report No. 2," issued in connection with Australian Patent Application No. 2016238926, dated Oct. 24, 2017, 10 pages.
Canadian Intellectual Property Office, "Notice of Allowance," issued in connection with Canadian Patent Application No. 3,016,393, dated Dec. 4, 2020, 1 page.
State Intellectual Property Office of the People's Republic of China, "First Office Action," issued in connection with Chinese Patent Application No. 201610889069.3, dated Apr. 18, 2018, 8 pages.
State Intellectual Property Office of the People's Republic of China, "Third Office Action," issued in connection with Chinese Patent Application No. 201610889069.3, dated Aug. 29, 2019, 12 pages.
IP Australia, "Notice of acceptance," issued in connection with Australian Patent Application No. 2016238926, dated Feb. 8, 2018, 3 pages.
State Intellectual Property Office of the People's Republic of China, "Fourth Office Action," issued in connection with Chinese Patent Application No. 201610889069.3, dated Aug. 20, 2020, 12 pages.
State Intellectual Property Office of the People's Republic of China, "Decision of Rejection," issued in connection with Chinese Patent Application No. 201610889069.3, dated Mar. 20, 2020, 14 pages.
National Intellectual Property Office of the People's Republic of China, "Notification on Granting patent," issued in connection with Chinese Patent Application No. 201610889069.3, dated Dec. 1, 2020, 14 pages.
European Patent Office, "Intention to grant," issued in connection with European Patent Application No. 18 192 938.1, dated Oct. 15, 2020, 7 pages.
Japan Patent Office, "Decision to Grant Patent," issued in connection with Japanese Patent Application No. 2018-170171, dated Nov. 20, 2020, 4 pages.
European Patent Office, "Communication pursuant to Article 94(3) EPC," issued in connection with European Patent Application No. 20 169 932.9, dated Mar. 24, 2021, 6 pages.
European Patent Office, "Extended European Search Report," issued in connection with European Patent Application No. 20 169 932.9, dated Jun. 26, 2020, 8 pages.
Canadian Intellectual Property Office, "Office Action," issued in connection with Canadian Patent Application No. 3,016,393, dated Jun. 29, 2021, 4 pages.
First Office Action dated Apr. 18, 2018 in corresponding Chinese Application No. 201810889089.3.

\* cited by examiner

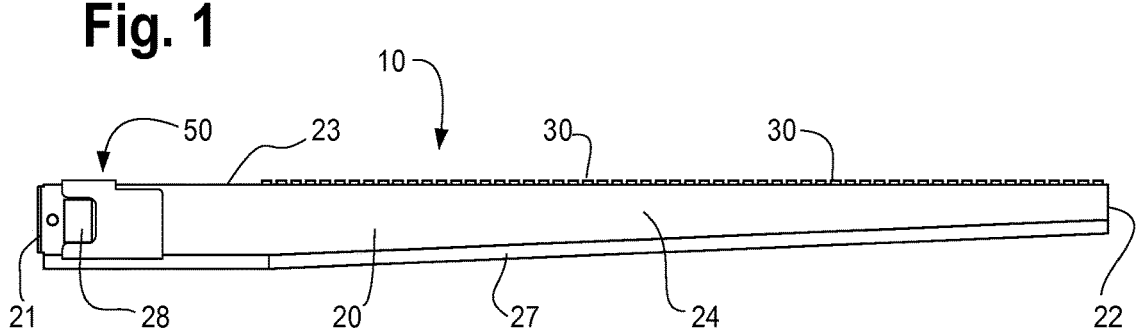
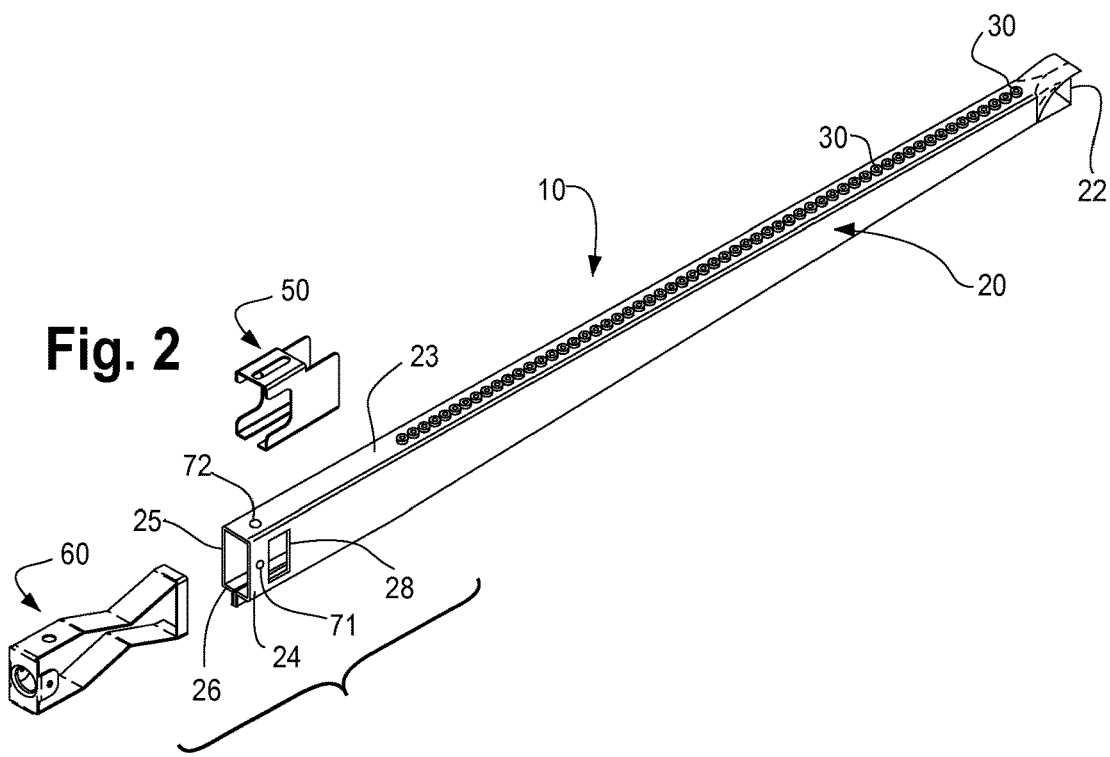
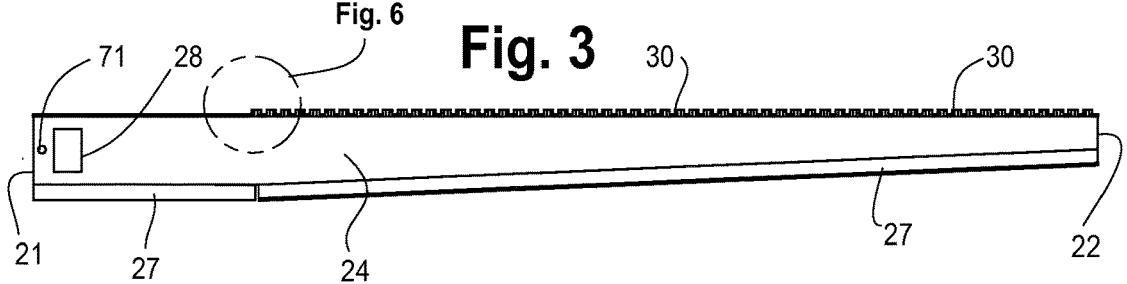
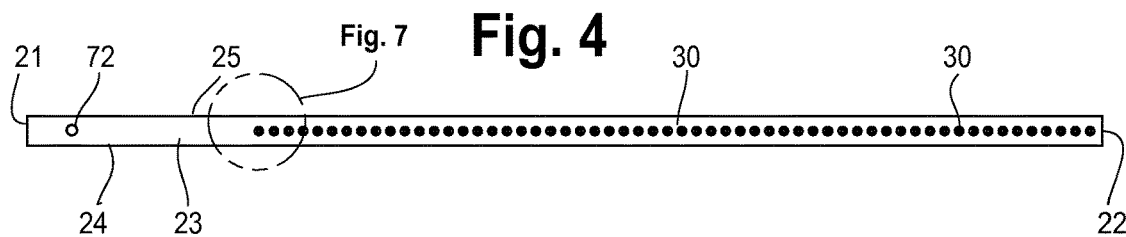

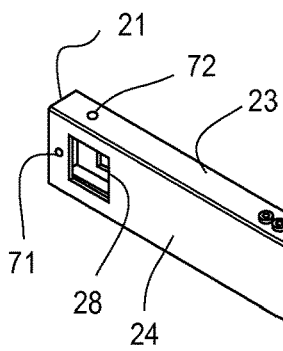
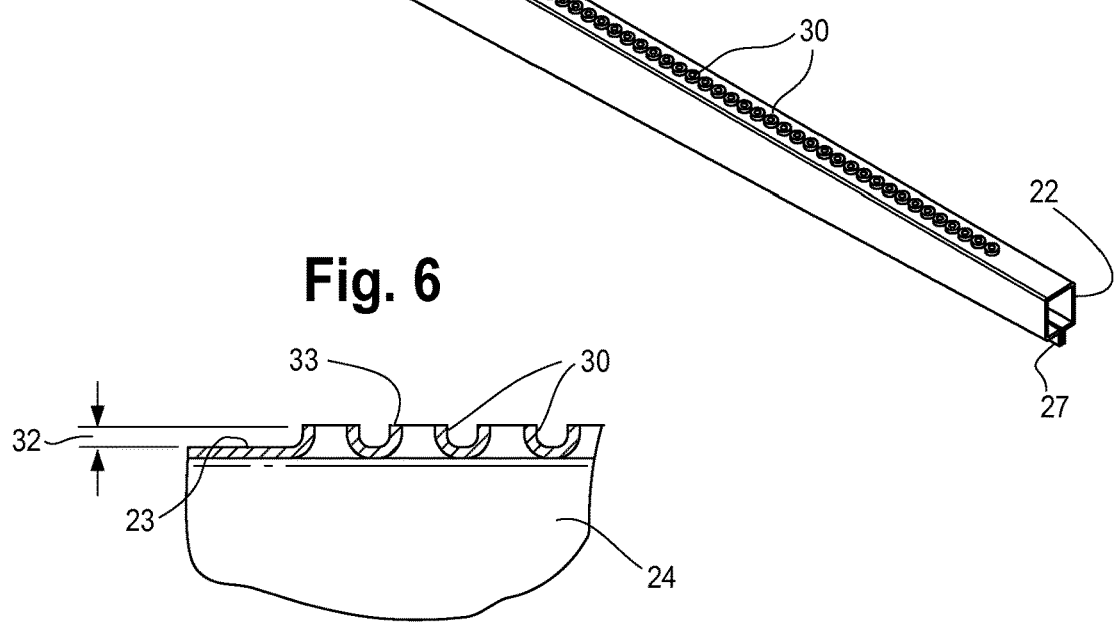
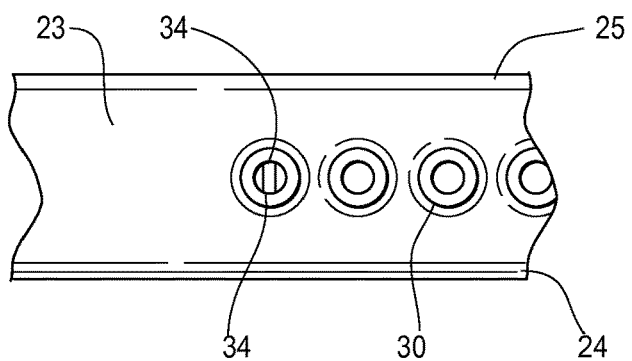

BURNER TUBE FOR GAS GRILL

FIELD OF THE INVENTION

The present inventions relate to burners for use in gas appliances such as gas grills. More particularly, the present inventions relate to tapered burner tubes having raised gas ports and a smooth interior surface.

BACKGROUND OF THE INVENTION

Burners and burner tube assemblies, including those used in gas grills, are well known. Most conventional gas grills include burner tube assemblies that provide a plurality of burner tubes, gas valves and a gas distribution manifold. Each burner tube has a length defined by an open end and a closed end and a plurality of outlet ports along the length of the burner tube between the open and closed ends. The open end of the burner tube typically includes an air shutter that it used to adjust the gas and combustion air mixture, as well as a venturi region to increase the velocity of the gas/air mixture in the tube. The open end is connected to the neck of a gas control valve, which is in fluid communication with a gas distribution manifold, which is in fluid communication with a gas source such as a tank.

For cost, manufacturing and other reasons, many conventional burner tubes are constructed from hollow welded circular tubing, often made from stainless steel. A venturi region is typically formed by pinching the tube near the open end of the burner tube. The venturi increases the velocity of the fuel/air mixture from the gas nozzle into the burner tube. An air shutter is also typically provided on the open end of the burner tube to adjust the fuel to air mixture.

Also for cost and other manufacturing reasons, the gas ports of typical burner tubes are punched into the tube from the outside of the tube to the inside, either on the top or sides of the tube. This results in burrs or other obstructions on the inside of the burner tube that can disrupt the flow of the fuel/air mixture and provide poor flame quality. Moreover, the flames produced by those burner tubes typically sit directly on the surface of the burner tube itself. This increases the temperature of the burner tube and can result in increased corrosion and clogging of the ports as well as a shorter life of the burner tube. In addition, many known burner tubes have a substantially uniform cross-section along their length that can result in uneven or inconsistent fuel pressure along the length of the tube. This can also negatively affect flame quality.

Thus, there is a need for improved burner tubes that provide improved flame characteristics and quality and which increase the life of the burner tube. There is also a need for burner tubes that enable smooth fuel/air flow throughout their length, as well as consistent pressure throughout the length of the burner tube. The present inventions solve the above described and other deficiencies and provide new features and advantages over known burner tubes.

SUMMARY OF THE INVENTION

In general, the burner tubes of the present inventions are part of burner assemblies used with gas grills. The present inventions preserve the advantages of known burner tubes and provide new features and advantages, some of which are described below and others which will be apparent to those of ordinary skill in the art.

In accordance with the present inventions, a burner for use in a gas grill is provided. It includes a tapered burner tube having an open end, a closed end and a substantially hollow and smooth interior which is free of burrs or other obstructions. The burner tube includes an upper surface, the upper surface including a plurality of gas ports having a height projecting above the upper surface of the tube and an opening at the top of the height, the opening having a diameter. A venturi member at the open end of the burner tube is also provided, the venturi member including two opposing, generally v-shaped flanges to restrict the interior of the open end of the burner tube.

In a preferred embodiment, the gas port height is between approximately 0.020 and 0.62 inches and the opening diameter is between approximately 0.075 and 0.110 inches. More specifically and preferred, the gas port height is approximately 0.060 inches and the port diameter is approximately 0.093 inches. In addition and as preferred, the ratio of gas port height to opening diameter is between approximately 0.640 and 0.650, and preferably greater than 0.5.

The present inventions also provide a burner assembly for a gas grill, the assembly having a burner tube, the burner tube including an open end and a closed end and a length between the open end and the closed end and an upper surface. The burner tube further includes a cross-sectional shape defining a hollow interior, wherein the cross-sectional shape is tapered and defines an area that decreases from the open end to the closed end. Also included is a plurality of raised gas ports along the length of the upper surface of the burner tube, the gas ports having a height projecting above the upper surface of the burner tube and an opening at the top of the height of the gas port, the opening having a diameter. In addition, the hollow interior of the burner tube is free from burrs or other obstructions.

In a preferred embodiment the ratio of the height of the gas port in inches to the diameter of the gas port opening in inches is between approximately 0.625 and 0.670. It is also preferred that the height of the port is between 0.020 inches and 0.062 inches and the opening diameter is between 0.075 inches and 0.110 inches. More specifically and preferred, the height of the port is approximately 0.060 inches and the opening diameter is approximately 0.093 inches.

Also provided by the present inventions is a burner assembly for a gas grill, the grill having a fuel source, a gas distribution manifold in fluid communication with the fuel source and control valves in fluid communication with the gas distribution manifold. A burner tube having an open end, a closed end and a substantially hollow interior, the burner tube gradually tapering from the open end to the closed end, is also provided. A plurality of raised gas ports Is included on an upper surface of the burner tube, the gas ports projecting above the upper surface of the burner tube having a height front the upper surface and an opening at the top of the height, the opening having an area. The interior of the burner tube is free from burrs or obstructions to permit the smooth flow of fluid along the length of the interior of the burner tube and wherein a flame sits on top of the openings of the gas ports and above the upper surface of the burner tube.

In a preferred embodiment, the height of the gas ports is between 0.020 and 0.062 inches and the area of the port opening is between 0.006 and 0.008 square inches. In the particular preferred embodiment, the height of the gas port is approximately 0.060 inches and the area of the opening is approximately 0.007 square inches. A venturi member and an air shutter may also be provided.

Alternatively, the port opening may be generally circular and have a diameter. In a preferred embodiment, the height of the gas port is between 0.020 and 0.062 inches and the diameter of the opening is between 0.075 and 0.110 inches. In the preferred embodiment, the height of the gas port is approximately 0.060 inches and the diameter of the opening is approximately 0.093 inches.

Accordingly, it is an object of the present inventions to provide a safe, reliable burner tube that efficiently operates over a wide range of gases and mixtures and a wide range of input pressures.

It is another object of the present inventions to provide a tapered burner tube that enables consistent pressure along the length of the tube.

Still another object of the present inventions is to provide a burner tube having a smooth interior surface that enables laminar fluid flow along the length of the interior of the tube.

Yet another object of the present inventions is to provide raised gas ports that enable better flame characteristics and help maintain a cooler burner tube temperature.

Still yet another object of the present inventions is to manufacture the burner tube by forming the raised gas ports from what will be the inside of the burner tube to what will be the outside of the burner tube so that the interior of the burner tube is smooth and tree from burrs of other obstructions.

An additional object of the present inventions is to reduce corrosion and gas port clogging of the burner tube.

Still an additional object of the present inventions is to provide larger gas port openings that provide improved flame characteristics and are less susceptible to corrosion, yet are not prone to backflash or flame pull back into the burner tube when in use.

Yet an additional objection of the present inventions is to enable greater material selection as well as manufacturing and cost advantages.

A further object of the present inventions is to provide a burner tube having improved flame characteristics and less material degradation.

Still a further object of the present inventions is to provide an improved venturi member and including one that functions with a burner tube having a non-circular cross-section.

Still yet another object of the present inventions is to provide an improved burner tube having a tapered cross-section, a venturi member and an air shutter that cooperates with the open end of the burner tube to adjust the fuel/air mixture.

Inventor'S Definition of the Terms

The following terms which may be used in the various claims and/or specification of this patent are intended to have their broadest meaning consistent with the requirements of law:

As used herein, "front" or "forward" is used by reference to the front or toward the front of a gas grill which typically includes the control panel, gas control knobs and the like.

As used herein, "rear" or "rearward" is used by reference to the back or toward the back of a typical gas grill.

As used herein, "air shutter" shall mean the device, typically found at the open end of the burner tube, that cooperates with the open end of the burner tube to permit the adjustment of an opening of the burner tube to control the fuel to combustion air mixture.

As used herein, "ignition system" shall mean devices that are capable of generating sparks to ignite the fuel/air mixture emitted from the outlet ports of a burner tube.

Where alternative meanings are possible, in either Ute specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 1 is a side plan view of a preferred embodiment of a burner tube of the present invention, shown with a preferred air shutter and preferred venturi member installed and shown with the closed end prior to closure;

FIG. 2 is an exploded perspective view of the components of the embodiment of FIG. 1 and showing the closed end, closed;

FIG. 3 is a side plan view of a preferred embodiment of the burner tube of the present invention of FIG. 1;

FIG. 4 is atop plan view of the preferred burner tube of FIG. 3;

FIG. 5 is a perspective view of the preferred burner tube of FIG. 3;

FIG. 6 is a cross-sectional detail view of the preferred raised gas ports of the present invention;

FIG. 7 is a top detail plan view of the preferred raised gas ports of the present invention;

DETAILED DESCRIPTION OF PREFERRED EMBODIMENTS

Figure 8:
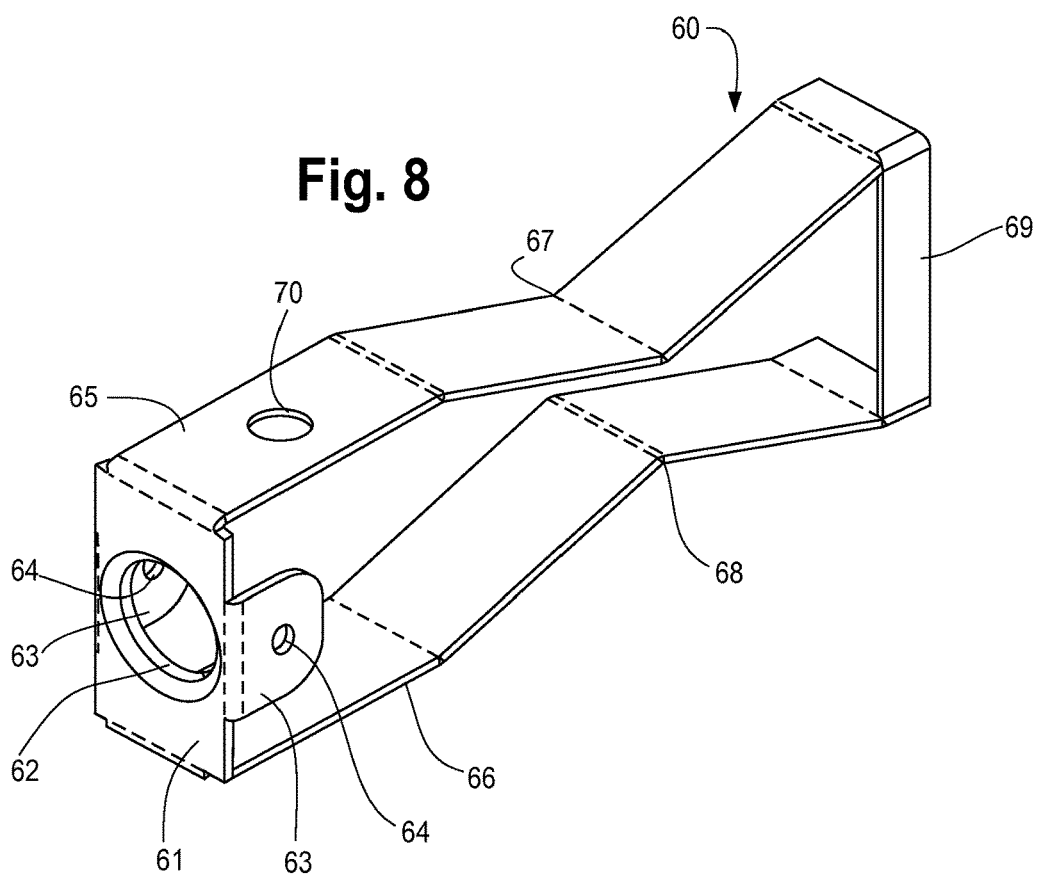
FIG. 8 is a perspective view of a preferred venturi member of the present invention; and, FIG. 9 is a perspective view of a preferred air shutter of the present invention.

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

The overall aspects of a burner assembly 10 of the present inventions may be seen by reference to FIGS. 1 and 2. Burner assembly 10 includes a preferred burner tube 20, an air shutter 50 and a venturi member 60. Burner tube 20 has a length between an open end 21 and a closed end 22. Open end 21 is typically toward the front of the grill adjacent to a gas valve and gas distribution manifold (not shown) and the closed end 22 is typically secured to the rear of a grill. In most situations, a grill will include a plurality of burner tubes 20 spaced parallel to each other.

In a preferred embodiment, burner tube 20 has a rectangular cross-sectional shape, with an upper surface 23, two side surfaces 24, 25 and a bottom surface 26 forming a substantially hollow interior. It will be understood by those of skill in the art that the cross-sectional shape of hunter tube 20 does not have to be rectangular, as in the preferred embodiment. For example, the cross-sectional shape may be square, circular or oval. In the preferred embodiment, the burner tube 20 is tapered, i.e., there is a gradual decrease in cross-sectional area along the length from the open end 21 to the closed end 22. This permits a constant pressure of the fuel/air mixture throughout the length of the burner tube 20. A window 28 is provided on each side 24, 25 near the open end 21 of burner tube 20. The window 28, in conjunction with air shutter 50 (FIG. 9), is used to adjust the air/fuel mixture as will be understood by those of skill in the art.

A plurality of gas ports 30 are also provided. In a preferred embodiment, gas ports 30 are equally spread along the top surface 23 of the burner tube 20. It will be understood by those of skill in the art that the number and spacing of ports, as well as the size of the cross-sectional shape of burner tube 20, is calculated or determined based upon the BTU's desired from each burner tube 20. Importantly, the gas ports 30 are formed or extruded from the inside of tube 20 to the outside of tube 20. In this manner, unlike conventional burner tubes which are punched from the outside to the inside of the tube, there are no burrs or obstructions on the inside of the burner tube 20 to obstruct the fuel/air flow or to make that flow turbulent. As a result, desirable blue flame characteristics, among other advantages, are achieved.

In the preferred embodiment and preferred method of its manufacture, burner tube 20 is constructed from a single sheet of appropriately sized and shaped material, typically stainless steel. On what will become the inside of burner tube 20, gas ports 30 are formed or extruded on what will be the top surface 23. Once the ports 30 are formed from the inside to the outside, the sheet of material is then folded to form the upper 23 and side surfaces 24, 25, as well as bottom surface 26. A tab 27 is provided and welded together so that a substantially hollow, tapered and burr-free burner tube 20 is formed. See FIGS. 1, 2, 3 and 5. It will be understood by those of skill in the art that there are methods, other than the preferred method, of manufacturing tapered burner tube 20 and ports 30 consistent with the goals and objects of the present inventions.

The preferred raised gas ports 30 of the present inventions may better be seen by reference to FIGS. 6 and 7. Each port 30 has a height 32 measured from the upper surface 23 with an opening 33 at the top of the height 32. Each opening 33 has a diameter 34. In the preferred embodiment, the openings 33 are circular. It will be understood by those of skill in the art that openings 33 may be another shape and that the dimensions discussed herein for diameter may be readily converted to area if, for example, square or rectangular openings are used. Because the opening 33 of port 30 is raised above upper surface 23 of burner tube 20, the flame is also lifted above upper surface 23 of burner tube 20. This improves flame quality and reduces the temperature of tube 20 during grilling, which increases the life of the tube 20 and prevents corrosion and clogging of the port openings 33. It will be understood by those of skill in the art that ports 30 may alternatively be located on one or both side surfaces 24, 25. It will also be understood that non-rectangular shapes of burner tube 20 may also be used consistent with the present inventions.

Tests have shown that the ratio of port height 32 to port opening 33 diameter 34 is important to proper and efficient flame quality and burner tube 20 longevity. The ideal theoretical port height 32 to port opening 33 diameter 34 is 1:1. However, in practice, that ratio is unobtainable when cost effectively manufacturing a burner tube 20 of the present inventions. Since the ports 30 are formed from the material of upper surface 23, there is only so much material available to form the ports 30, as will be understood by those of skill in the art. In addition, tests have also shown that in burner tubes 20 sized for use in typical gas grills, the port opening 33 diameter 34 should not exceed 0.110" to avoid flame pullback into burner tube 20. Thus, it has been determined that the maximum, reasonably feasible port height 32 is approximately 0.020" to 0.062". And, the preferred port opening 33 diameter 34 is between approximately 0.075" and 0.110". In the preferred embodiment, the port height 32 to opening diameter 34 ratio is approximately 0.645. This preferred ratio is achieved using a preferred port height 32 of 0.060" and a preferred port opening diameter 34 of 0.093". This preferred configuration, along with the taper of burner tube 20, provides the best flame quality, reduces clogging and extends the life of the burner tube 20.

A preferred venturi member 60 may be seen by reference to FIG. 8. Venturi member 60 includes a front face 61 having an opening 62 to accommodate the neck of a typical gas valve (not shown). A rearwardly projecting side tab 63 having a hole 64 is also provided on each side of front face 61. A top flange 65 and a bottom flange 66 project rearward of face 61. Top flange 65 includes a v-shaped portion having an apex 67. Similarly, bottom flange 66 includes an inverted v-shaped portion having an apex 68. As can be seen in FIG. 8, the space between the top and bottom flanges 65 and 66 becomes constricted where the two opposing apexes 67 and 68 meet. A stabilizer brace 69 is provided at the rear of the member to support the upper and lower flanges 65 and 66. A hole 70 may be provided on upper flange 65 near the front in order lo accommodate a screw used to secure air shutter 50 to the hunter tube 20 (see FIGS. 2 and 9), as hereinafter described.

As shown in FIGS. 1 and 2, venturi member 60 is inserted into the open end 21 of burner tube 20. It may be affixed to the burner tube 20 using a screw (not shown) through hole 64 of tab 63 into holes 71 in the sides 24, 25 of burner tube 20. ft will be understood that other means may be used to attach venturi member 60 to burner tube 20.

When inserted into burner tube 20, the neck of a typical gas valve (not shown) is inserted into opening 62. As the fuel/air mixture passes between the space between upper apex 67 and lower apex 68, it velocity is increased. It will be understood by those of skill in the art that venturi member 60 is shaped and sized to fit within the open end 21 and coincides with the cross-sectional shape of burner tube 20.

Figure 9:
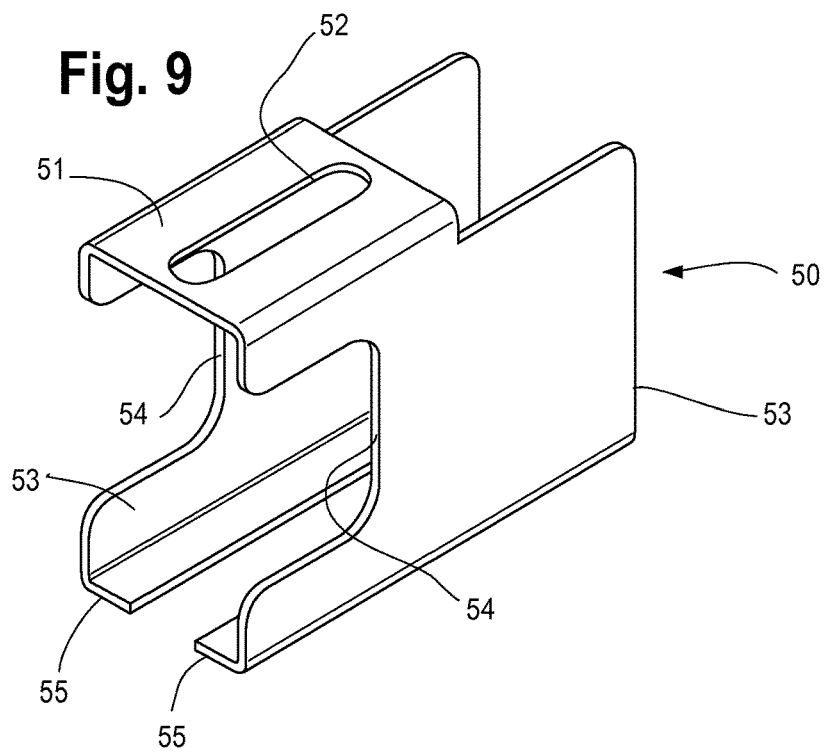

A preferred air shutter 50 of the present inventions may be seen by reference to FIG. 9. As will be understood by those of skill in the art, air shutter 50 cooperates with the window 28 at the open end 21 of burner tube 20 to permit adjustment of the combustion air to fuel mixture. Preferred shutter 50 includes a top 51 having a slot 52 which is used to secure shutter 50 through hole 72 to burner tube 20 once in the proper position for the desired mixture. Shutter 50 includes two sides 53, each having a recess 54 and two bottom sections 55. It will be understood by those of skill in the art that a space between bottom members 55 is provided to accommodate tab 27 on the bottom of burner tube 20 that is part of a preferred manufacturing process. The recesses 54 of sides 53 accommodate the attachment flanges 63 of venturi member 60 when it is attached to burner tube 20.

When in use, the neck of a gas valve is inserted into opening 62 of venturi member 60 with the open end of burner tube 20 typically at the front of the grill. The closed end 22 of burner tube 20 is movably secured to a rear of the grill and the open end slidingly connected to the valve neck by the air shutter 50. In this manner, tube 20 may expand and contract as necessary during use. The gas is injected into venturi member 60 and mixed with the desired amount of combustion air using air shutter 50. The velocity of the fuel/air mixture is accelerated by die venturi member 60 and flows down the length of burner tube 20. Because of the taper of burner tube 20, the pressure throughout the length of the tube 20 is relatively constant.

When lit, the flame sits on top of the raised gas ports 30 at the opening 33. Since the flame is lifted off of the upper surface 23 of burner tube 20, the burner tube 20 remains cooler. This results in less port 30 clogging and less corrosion of the burner tube 20. In this manner, a longer life of burner tube 20 and high flame quality may be achieved. In addition, when the preferred port height 32 to port opening 33 diameter 34 is used, flame quality is further increased.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A burner for combustion of a gas and air mixture under atmospheric pressure for use in a gas grill, the burner comprising:
    a tapered burner tube having an open end, a closed end, and a substantially hollow and smooth interior which is free of burrs, interior crimps or other obstructions, the tapered burner tube including an upper surface having a plurality of gas ports;
    an air shutter that cooperates with the open end of the burner tube to permit adjustment of an air flow into the burner tube to be mixed with fuel; and
    a venturi member inserted at least partially into the open end of the burner tube to restrict the interior of the open end of the burner tube to increase a velocity of the gas and air mixture injected into the burner tube upstream from a constriction of the venturi member, the venturi member including:
        a front face with an opening positioned at the open end of the burner tube and at least one side tab attached to the front face and projecting rearwardly therefrom;
        an upper flange coupled to the front face at a first end of the upper flange, the upper flange having a generally V-shape profile;
        a lower flange coupled to the front face at a first end of the lower flange, the lower flange opposing the upper flange, the lower flange having a generally inverted V-shape profile; and
        a stabilizer bar coupled to respective second ends of the upper and lower flanges opposite the first ends that are coupled to the front face.

2. The burner of claim 1, wherein the gas ports each project a port height from the upper surface of the burner, and wherein each of the gas ports has an opening defining a port diameter, wherein the port height of each gas port is between approximately 0.020 and 0.062 inches and the port diameter of each opening of the gas ports is between approximately 0.075 and 0.110 inches.

3. The burner of claim 2, wherein the gas port height is approximately 0.060 inches and the port diameter is approximately 0.093 inches.

4. The burner of claim wherein a ratio of gas port height to port diameter is between approximately 0.640 and 0.650.

5. The burner of claim 4, wherein the gas port height to port diameter ratio is greater than 0.5.

6. The burner of claim 1, wherein a ratio of gas port height to port diameter is between approximately 0.625 and 0.670.

7. A burner assembly for a gas grill, the gas grill having a fuel source, a gas distribution manifold, a gas nozzle and control valves, the burner assembly comprising:
    a burner tube having an open end, a closed end, and a substantially hollow interior that defines a fluid flow path between the open end and the closed end, the burner tube gradually tapering from the open end to the closed end;
    a plurality of gas ports projecting a height above an upper surface of the burner tube;
    a venturi member inserted into the open end of the burner tube to restrict an area inside an entrance of the burner tube and increase a velocity of a fuel and air mixture, the fuel and air mixture to flow along a length of the burner tube the venturi member including:
        a front face plate having an opening to receive a neck of a gas valve and at least one side tab attached to the front face and projecting rearwardly therefrom, the front face plate positioned proximate the open end of the burner tube;
        a first flange coupled to the front face plate, the first flange including a first planar portion extending from the front face plate, a first declined portion extending away from the first planar portion, and a first inclined portion extending away from the first declined portion;
        a second flange coupled to the front face plate, the second flange including a second planar portion extending from the front face plate, a second inclined portion extending away from the second planar portion, and a second declined portion extending away from the first declined portion, wherein the first inclined portion and the second declined portion form a diverging portion of the fluid flow path, and the second inclined portion and the second declined portion form a converging portion of the fluid flow path; and
        a stabilizer brace coupled to respective ends of the first inclined portion and the second declined portion to support the first flange and the second flange.

8. The burner assembly of claim 7, wherein the height of each gas port is between 0.020 and 0.062 inches and an area of the opening is between 0.006 and 0.008 square inches.

9. The burner assembly of claim 8, wherein the height of each gas port is approximately 0.060 inches and the area of the opening is approximately 0.007 square inches.

10. The burner assembly of claim 7, wherein an opening of each gas port is generally circular, having a diameter.

11. The burner assembly of claim 10, wherein the height of each gas port is between 0.020 and 0.062 inches and the diameter of the opening of each gas port is between 0.075 and 0.110 inches.

12. The burner assembly of claim 11, wherein the height of each gas port is approximately 0.060 inches and the diameter of the opening of each gas port is approximately 0.093 inches.

13. The burner of claim 1, wherein the venturi member is attached to at least one side of the burner tube near the open end using the at least one side tab of the venturi member.

14. The burner assembly of claim 7, wherein the venturi member is attached to at least one side of the burner tube near the open end using the at least one side tab of the venturi member.

15. The burner of claim 1, wherein the generally V-shaped flanges converge to restrict the interior of the open end of the burner tube.

16. The burner of claim 1, wherein the gas ports are formed solely from portions of the upper surface of the burner tube.

17. The burner of claim 1, wherein the venturi member is separate from the gas nozzle.

18. The burner of claim 1, wherein the venturi member does not create any obstructions or recesses to interfere with the gas flow upon the gas flow exiting the constricted area of the venturi member.

19. The burner assembly of claim 7, wherein the burner tube includes a window on a side surface of the burner tube between the open end and the closed end and proximate the open end, and the burner assembly further including an air shutter that cooperates with the open end of the burner tube to permit adjustment of an air flow into the flow path of the burner tube to be mixed with fuel, the air shutter slidably coupled to the open end of the burner tube and moveable along a portion of the burner tube to adjust an area defined by the window of the burner tube, the air shutter having an upper surface that includes a slot to enable adjustment of the air shutter relative to the window of the burner tube.

\* \* \* \* \*